United States Patent
Carroll et al.

(10) Patent No.: US 6,879,689 B2
(45) Date of Patent: Apr. 12, 2005

(54) STREAM-CIPHER METHOD AND APPARATUS

(75) Inventors: Christopher Paul Carroll, Natick, MA (US); Muxiang Zhang, Malden, MA (US); Agnes Chan, Lincoln, MA (US)

(73) Assignees: Verizon Laboratories Inc., Waltham, MA (US); Genuity, Inc., Cambridge, MA (US)

(*) Notice: Subject to any disclaimer, the term of this patent is extended or adjusted under 35 U.S.C. 154(b) by 861 days.

(21) Appl. No.: 09/851,870

(22) Filed: May 9, 2001

(65) Prior Publication Data

US 2002/0006197 A1 Jan. 17, 2002

Related U.S. Application Data

(60) Provisional application No. 60/203,026, filed on May 9, 2000.

(51) Int. Cl.[7] .................................................. H04L 9/00
(52) U.S. Cl. ........................................... 380/44; 380/46
(58) Field of Search ....................................... 380/44, 46

(56) References Cited

U.S. PATENT DOCUMENTS

| | | | |
|---|---|---|---|
| 5,455,863 A | 10/1995 | Brown ........................ 380/23 |
| 5,499,297 A | 3/1996 | Boebert ....................... 380/34 |
| 5,546,464 A | 8/1996 | Raith et al. ................... 380/48 |
| 5,592,555 A | 1/1997 | Stewart ........................ 380/49 |
| 5,982,900 A | 11/1999 | Ebihara et al. ............... 380/30 |
| 5,983,252 A | 11/1999 | Clapp ......................... 708/250 |
| 6,014,445 A | 1/2000 | Kohda et al. ................. 380/28 |
| 6,510,228 B2 * | 1/2003 | Rose ............................ 380/46 |

OTHER PUBLICATIONS

Maxiang Zhang et al., The Software-Oriented Stream Cipher SSC2, Springer-Verlag Berlin Heidelberg, Apr. 12, 2000, Lecture Notes in Computer Science: Proceedings of the 7th International Workshop of Fast Software Encryption, pp. 31–48.*

* cited by examiner

*Primary Examiner*—Gregory Morse
(74) *Attorney, Agent, or Firm*—Leonard C. Suchtya, Esq.; Joel Wall, Esq.; Finnegan, Hederson, Farabow et al

(57) ABSTRACT

Methods and systems are provided for processing information. In one embodiment, there is provided a method, providing a frame key based on a master key and a frame number of a frame of information to a keystream generator as an initial fill for one or more registers of the keystream generator such that the initial fill establishes a state for the one or more registers of the keystream generator; and generating, at the keystream generator, a keystream sequence based on the state established by the initial fill, wherein the keystream sequence includes a modulo-2 sum of a lagged-Fibonacci sequence and a pseudo-random sequence produced by a filter generator.

33 Claims, 5 Drawing Sheets

STREAM-CIPHER METHOD AND APPARATUS

CROSS REFERENCE TO RELATED APPLICATION

This application claims the benefit of U.S. Provisional Patent Application No. 60/203,026, entitled "SOFTWARE ORIENTED STREAM-CIPHER," filed on May 9, 2000, the disclosure of which is expressly incorporated herein by reference in its entirety.

BACKGROUND OF THE INVENTION

A. Field of the Invention

The present invention relates generally to encryption systems. More particularly, the present invention relates to the use of encryption devices in mobile communications.

B. Description of the Related Art

The use of encryption algorithms in cellular and personal communications have been constrained for various reasons. First, the lack of computing power in mobile stations, such as a mobile telephone, may limit the use of computationally intensive encryption algorithms, such as public key algorithms. Second, due to the high bit error rate of wireless channels, encryption algorithms may propagate errors that further deteriorate the quality of data transmission. Third, the shortage of bandwidth at uplink channels (e.g., from a mobile station to a base station) may make ciphers at low encryption (or decryption) rates unacceptable. Moreover, random delays in encryption or decryption may be present, which further reduces the desirability of encryption algorithms in cellular and personal communications.

To handle these issues, the European Group Special Mobile (GSM) adopted a hardware implemented stream cipher known as A5. The A5 stream cipher consists of three linear feedback shift registers of total length 64 bit that are mutually clocked in a stop-and-go manner.

Unlike a block cipher that accumulates data into a block before ciphering, a stream cipher may directly process messages of arbitrary size by ciphering individual elements, such as bits or bytes. Stream ciphers may be used in secure communications and commonly include a keystream generator whose output sequence is added modulo 2 to the plaintext bits producing a random-looking sequence, which is also referred to as a pseudo-random sequence.

Many kinds of keystream generators have been proposed including combination generators, filter generators, and clock-controlled shift registers. These keystream generators include one or more linear feedback shift registers. A combination generator may consist of several linear feedback shift registers whose outputs are combined by a nonlinear Boolean function. A filter generator may consist of a single linear feedback shift register and use a nonlinear Boolean function to filter the contents of the shift register. Clock-controlled shift registers may irregularly clock certain parts of the keystream generator in order to achieve nonlinear effects.

To solve the synchronization problems inherent in stream ciphers, the A5 stream cipher combines a 64-bit secret session key with a 22-bit frame number to generate a 64-bit subkey for each frame. However, one disadvantage of A5 stream cipher is that its hardware implementation may add additional cost to the fabrication of cellular and personal communications units. Another disadvantage of A5 stream cipher is that the cost to readily modify the A5 stream cipher may be high in the event that a modification becomes necessary to overcome a known vulnerability of the A5 cipher.

SUMMARY OF THE INVENTION

To address one or more limitations of the prior art, there is provided a method, for providing a frame key based on a master key and a frame number of a frame of information to a keystream generator as an initial fill for one or more registers of the keystream generator such that the initial fill establishes a state for the one or more registers of the keystream generator; and generating, at the keystream generator, a keystream sequence based on the state established by the initial fill, wherein the keystream sequence includes a modulo-2 sum of a lagged-Fibonacci sequence and a pseudo-random sequence produced by a filter generator.

Moreover, in another embodiment, systems consistent with the present invention may include at least one memory including code that provides a frame key based on a master key and a frame number of a frame of information to a keystream generator as an initial fill for one or more registers of the keystream generator such that the initial fill establishes a state for the one or more registers of the keystream generator, and code that generates, at the keystream generator, a keystream sequence based on the state established by the initial fill, wherein the keystream sequence includes a modulo-2 sum of a lagged-Fibonacci sequence and a pseudo-random sequence produced by a filter generator; and at least one processor that executes said code.

Furthermore, in another embodiment there is provided a computer program product, the computer program product comprising code, said code including code that provides a frame key based on a master key and a frame number of a frame of information to a keystream generator as an initial fill for one or more registers of the keystream generator such that the initial fill establishes a state for the one or more registers of the keystream generator; and code that generates, at the keystream generator, a keystream sequence based on the state established by the initial fill, wherein the keystream sequence includes a modulo-2 sum of a lagged-Fibonacci sequence and a pseudo-random sequence produced by a filter generator.

In still another embodiment, there is provided a hand held device for communicating information, said hand held device comprising at least one memory including code that provides a frame key based on a master key and a frame number of a frame of information to a keystream generator as an initial fill for one or more registers of the keystream generator such that the initial fill establishes a state for the one or more registers of the keystream generator, and code that generates, at the keystream generator, a keystream sequence based on the state established by the initial fill, wherein the keystream sequence includes a modulo-2 sum of a lagged-Fibonacci sequence and a pseudo-random sequence produced by a filter generator; and at least one processor that executes said code. Moreover, the hand held device may further include code that receives code and information from a base station; and code that configures the keystream generator based on the received code and information.

It is to be understood that both the foregoing general description and the following detailed description are exemplary and explanatory only and are not restrictive of the invention, as described. Further features and/or variations may be provided in addition to those set forth herein. For example, the present invention may be directed to various combinations and subcombinations of the disclosed features and/or combinations and subcombinations of several further features disclosed below in the detailed description.

DESCRIPTION OF THE DRAWINGS

The accompanying drawings, which are incorporated in and constitute a part of this specification, illustrate embodiments of the invention and, together with the description, explain the advantages and principles of the invention. In the drawings.

DETAILED DESCRIPTION

Reference will now be made in detail to the exemplary embodiments of the invention, examples of which are illustrated in the accompanying drawings. Wherever possible, the same reference numbers will be used throughout the drawings to refer to the same or like parts.

In accordance with an embodiment of the present invention, a method and system for providing a stream cipher is provided. The stream cipher system consistent with the present invention may process one or more frames of information into a bit stream of ciphertext or into a bit stream of plaintext. For example, the stream cipher system may receive and then process a bit stream of plaintext and produce a bit stream of ciphertext. Alternatively, the stream cipher system may receive and then process a bit stream of ciphertext and produce a bit stream of plaintext. A bit stream of plaintext may include information, such as voice, image, and data information, in an unencrypted format. A stream of ciphertext may include information, such as voice, image, and data information, in an encrypted format.

The stream cipher system may use a key, such as a master key or a frame key that serves as an initial fill for initializing a keystream generator of the stream cipher system. The initialized keystream generator may produce a keystream sequence that may be combined using modulo-2 addition to create a bit stream of plaintext from a bit stream of ciphertext or, alternatively, a bit stream of ciphertext from a bit stream of plaintext.

The keystream generator may generate a keystream sequence based on the state established by the initial fill. Moreover, the keystream generator may also generate the keystream sequence by modulo-2 adding a lagged-Fibonacci sequence and a pseudo-random sequence produced by a filter generator. In an embodiment, the filter generator may produce a pseudo-random sequence of bits based on a linear feedback shift register that includes 4 word-structured registers with each word including 32-bits, tap points at the 2, 3, and 4 words, and one or more exclusive OR (XOR) logic processors for modulo-2 adding the bits tapped at the tap points.

Figure 1:
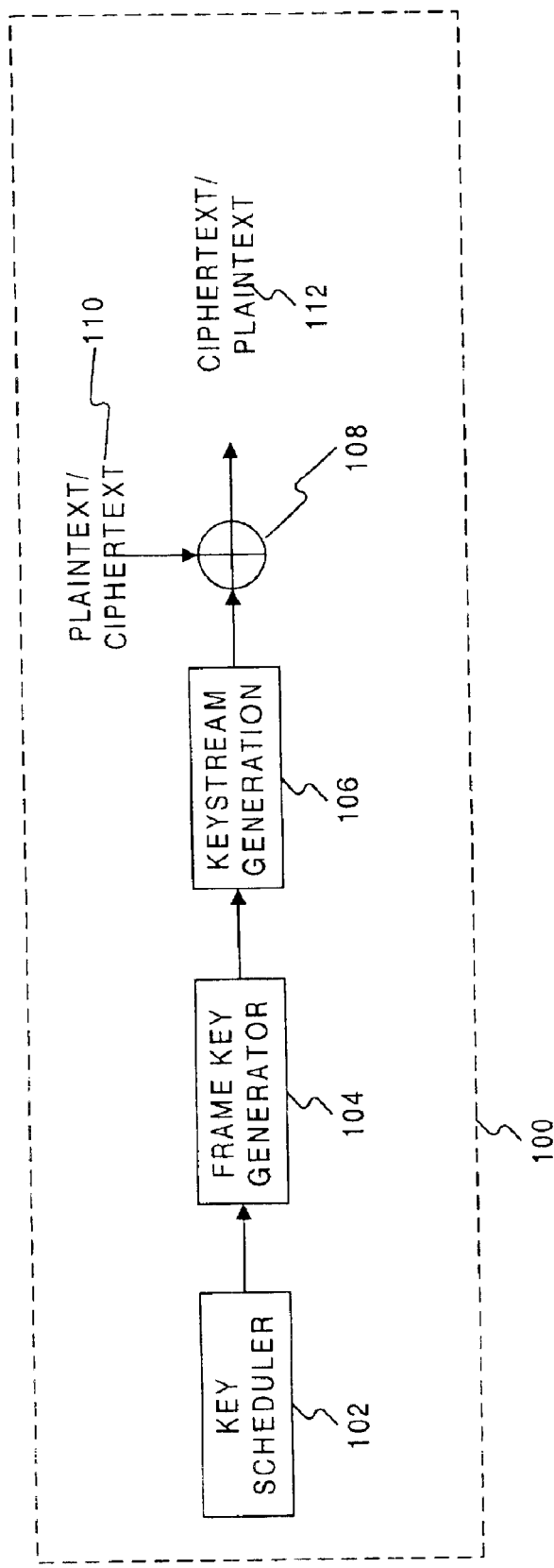
FIG. 1 illustrates a high-level block diagram of a stream cipher system, in accordance with methods and systems consistent with the present invention.

FIG. 1 illustrates an exemplary block diagram of a stream cipher system 100, designed in accordance with methods and systems consistent with the present invention. Referring to FIG. 1, the stream cipher system 100 may include a key scheduler 102, a frame key generator 104, a keystream generator 106, and a modulo-2 adder 108. The modulo-2 adder 108 may modulo-2 add a bit stream of plaintext 110 and a keystream sequence from the keystream generator 106 to produce a bit stream of ciphertext 112. The modulo-2 adder may be embodied as an exclusive OR (XOR) logic processor that performs a bitwise XOR on each bit of the bit stream of plaintext 110 and a corresponding bit in the keystream sequence. Alternatively, a bit stream of ciphertext 110 may be modulo-2 added with a corresponding bit in the keystream sequence using the modulo-2 adder 108 to produce a bit stream of plaintext 112.

The key scheduler 102 may produce a key, such as a master key including one or more bits that are used as an initial fill for the one or more linear feedback shift registers included within the keystream generator 106. Moreover, the master key may be used to generate other keys. The initial fill of a linear feedback shift register may also define a state, such as the initial state of the linear feedback shift register.

In one embodiment, the key scheduler 102 may produce the master key that includes 21 words of, for example, 32 bits. The 21 word master key may be generated from a private key that is between 4 bytes and 16 bytes long. The 21 word master key may be created from the private key using, for example, a hash function, such as a secure hash described in Federal Information Processing Standard (FIPS) 180, "Secure hash standard," April 1995. Alternatively, the master key may be generated using a master key generator based on the pseudo-code listed in Table 1. Table 1 shows pseudo-code from which code, such as C++, C, assembly language, microcode, or any other type of program instruction may be written and then executed using a processor.

TABLE 1

MASTER-KEY-GENERATION

```
1   LOAD PRIVATE KEY (K) INTO THE LFSR (S),
    REPEAT WHEN NECESSARY
2   for i ← 0 to 127 do
3       run the linear feedback shift register once
4       S[1] ← S[1] + F(S) mod 2³²
5       i ← i + 1
6   for i ← 1 to 17 do
7       run the linear feedback shift register once
8       B[i] ← S[4]
9       i ← i + 1
10  A ← S[1]
11  for i ← 1 to 34 do
12      run the linear feedback shift register once
13      run the lagged-Fibonacci generator once
14      index ← 1 + A >> 28
15      A ← B[index]
16      B[index] ← A ⊕ S[1]
17      S[1] ← A + S[1] mod 2³²
18      i ← i + 1
19  B[17] ← B[17] V 1
20  return S and B
```

Figure 3:
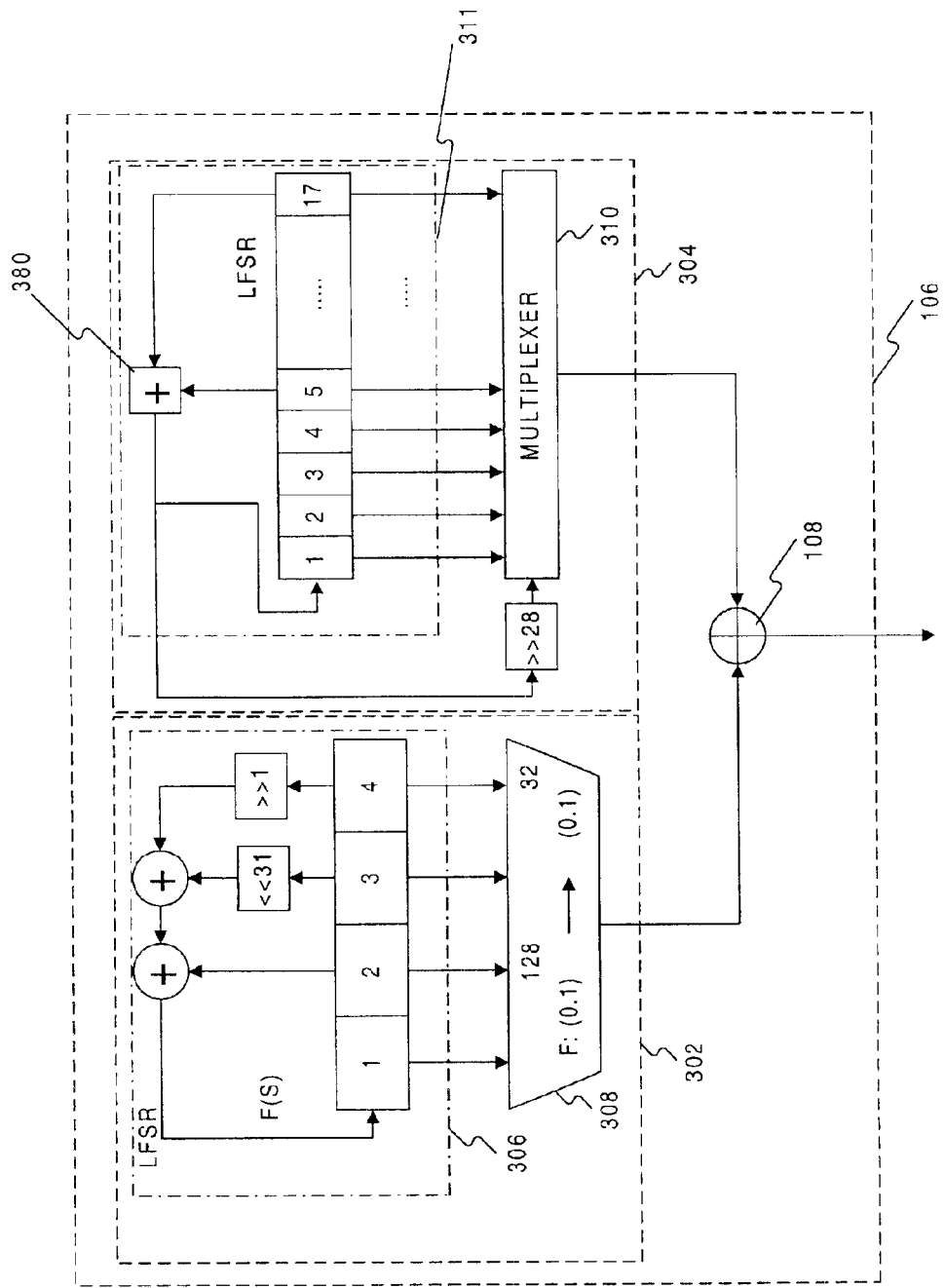
FIG. 3 illustrates a block diagram of a first embodiment of a keystream generator, in accordance with methods and systems consistent with the present invention.

In the above pseudo-code of Table 1, S corresponds to a linear feedback shift register (see, e.g., 306 at FIG. 3), and B represents the lagged-Fibonacci generator (see, e.g., 304 at FIG. 3). In addition, each time the linear feedback shift register 306 runs, a new 32 bit word enters S[1], the word of S[1] then shifts to S[2], the word of S[2] then shifts to S[3], the word of S[3] then shifts to S[4], and the word of S[4] then shifts out of the linear feedback shift register 306.

Referring to Table 1, master key generation may be considered as operating in five stages. In the first stage, a key, such as a private key may be loaded as an initial fill for the linear feedback shift register (S) 306 (see, e.g., Table 1 at line 1). In the second stage (see, e.g., Table 1 at lines 2–5), the private key may be processed such that approximately half of the bits in the linear feedback shift register 306 (S) will be "1" even if there is only one "1" in the private key. This processing may be accomplished by running the filter generator 302 that includes the linear feedback shift register (S) 306 128 times. In the third stage (see Table 1 at lines 6–9), 17 words are generated from the lagged-Fibonacci generator (B) 304. In fourth stage (see Table 1 at lines 10–18), the linear feedback shift register (S) 306 and the lagged-Fibonacci generator (B) 304 may interact with each other 34 times. In the fifth stage 5 (see Table 1 at lines 19–20), the least significant bit of B[17] of the lagged-Fibonacci generator (B) 304 may be set to "1" in order to ensure that not all of the 17 words of B are even. Moreover, the states of the linear feedback shift register (S) 306 and the lagged-Fibonacci generator (B) 304 may be output as the master key (see Table 1 at line 20).

Furthermore, the interaction between the linear feedback shift register (S) 306 and the lagged-Fibonacci generator (B) 304 (see Table 1 at lines 10–18) may make it more difficult to gain information about the state of the linear feedback shift register (S) 306 from the state of the lagged-Fibonacci generator (B) 304 and vice versa. For this purpose, an index register A may be used (see Table 1 at line 10), which includes S[1] (i.e., the first word of the linear feedback shift register (S) 304) as the initial value. At the end of each run of the linear feedback shift register (S) 306 and the lagged-Fibonacci generator (B) 304, an index may be computed according to the most significant 4 bits of A (see Table 1 at line 14), and then A is updated by the word B[index] (Table 1 at line 15). Following the update of A, B[index] may be updated by A⊕S[1] (Table 1 at line 16); and S[1] may be updated by A+S[1] mod $2^{32}$ (Table 1 at line 17).

In one embodiment, instead of using the master key as the initial fill for the linear feedback shift registers included within the keystream generator 106 (see, e.g., FIG. 3 at 306, 311), another key, such as a frame key, may be generated by the frame key generator 104. Based on a master key and a frame number for the frame of information to be enciphered, the frame key generator 106 may create the frame key for the frame of information to be enciphered. When a new frame is ready to be enciphered, a corresponding new frame number and the master key may be used to create a new frame key.

In one embodiment, the use of the frame key may reduce the difficulties associated with using encryption in wireless communication. For example, in wireless communications, there is a high likelihood that packets or frames may be lost due to bit errors or loss of synchronization. By using the frame key, only the frame affected by the bit error or loss of synchronization will be lost and subsequent frames each with a unique frame key will not be lost, enabling encryption or decryption of the subsequent frames.

The frame key may be generated using the frame number and the master key generator based on the pseudo-code listed in Table 2. Table 2 shows pseudo-code from which code, such as C++, C, assembly language, microcode, or any other type of program instruction may be written and then executed using a processor.

TABLE 2

FRAME-KEY-GENERATION (Kn)

1 LOAD MASTER KEY ($K_{MASTER}$) INTO S AND B
2 for j ← 0 to 3 do
3   for i ← 0 to 7 do
4     S[1] ← S[1] + B[1 + (i + $n_i$ mod 16)] mod $2^{32}$
5     S[2] ← S[2] + B[1 + (8 + i + $n_i$ mod 16)] mod $2^{32}$
6     run the linear feedback shift register once
7     B[17 − (i + 8j mod 16)] ← S[1] ⊕ B[17 − (i + 8j mod 16)]
8     i ← i + 1
9   j ← j + 1
10 B[17] ← B[17] ∨ 1
11 return S and B Referring to Table 2, each frame is labeled by a 32-bit frame number (n) that is not encrypted; Kn represents the frame key of the $n^{th}$ frame. When the frame key generator 106 implements code based on the psuedo-code listed in Table 2, the generation of frame keys may be fast and may make it difficult to gain information about $K_i$ from $K_j$ when i≠j. That is, the generation of a frame key $K_i$ by the frame key generator 106 may make it difficult to gain information about another previous or subsequent frame key $K_j$.

When the frame key generator 106 generates a different key for different frames based on the pseudo-code of Table 2, the frame key generator 106 may divide the 32-bit frame number, n, into 8 consecutive blocks. The frame key generator 106 may then use each of the 8 blocks when generating frame keys. Referring to Table 2 at lines 4 and 5, $n_1$ (i.e., $n_0, n_1, \ldots, n_7$) represents the 8 blocks of the frame number, n, where each block is four bits such that $n_0$ includes the four least significant bits of n, and $n_7$ includes the four most significant bits of n.

The pseudo-code of Table 2 shows two loops. The first loop corresponds to $n_i$, where 0≤i≤7 (Table 2 at lines 4–8). For each pass of the first loop, the frame key generator 104 may select two words from the buffer B to update the contents of S[1] and S[2]. The linear feedback shift register (S) 306 is also run once and the output word is used to update one word of B (lines 6–8). The second loop is an outer loop that executes the first loop 4 times. After the first run of the inner-loop, some words in S and B will be different for different frame numbers. Subsequent runs may produce more distinct words in the registers of S and B for use as a frame key (Kn).

The keystream generator 106 may use an initial fill that is changed each time the generator 106 is clocked or, alternatively, is programmed to contain an initial fill, such as the master key produced by the key scheduler 102 or the frame key produced by the frame key generator 104. Once the keystream generator 106 includes the initial fill, the keystream sequence produced at the output of the keystream generator 106 may be modulo-2 added, which may be implemented with a bitwise exclusive OR (XOR) operation, with either plaintext or ciphertext 110 to produce ciphertext or plaintext 112, respectively.

Figure 2:
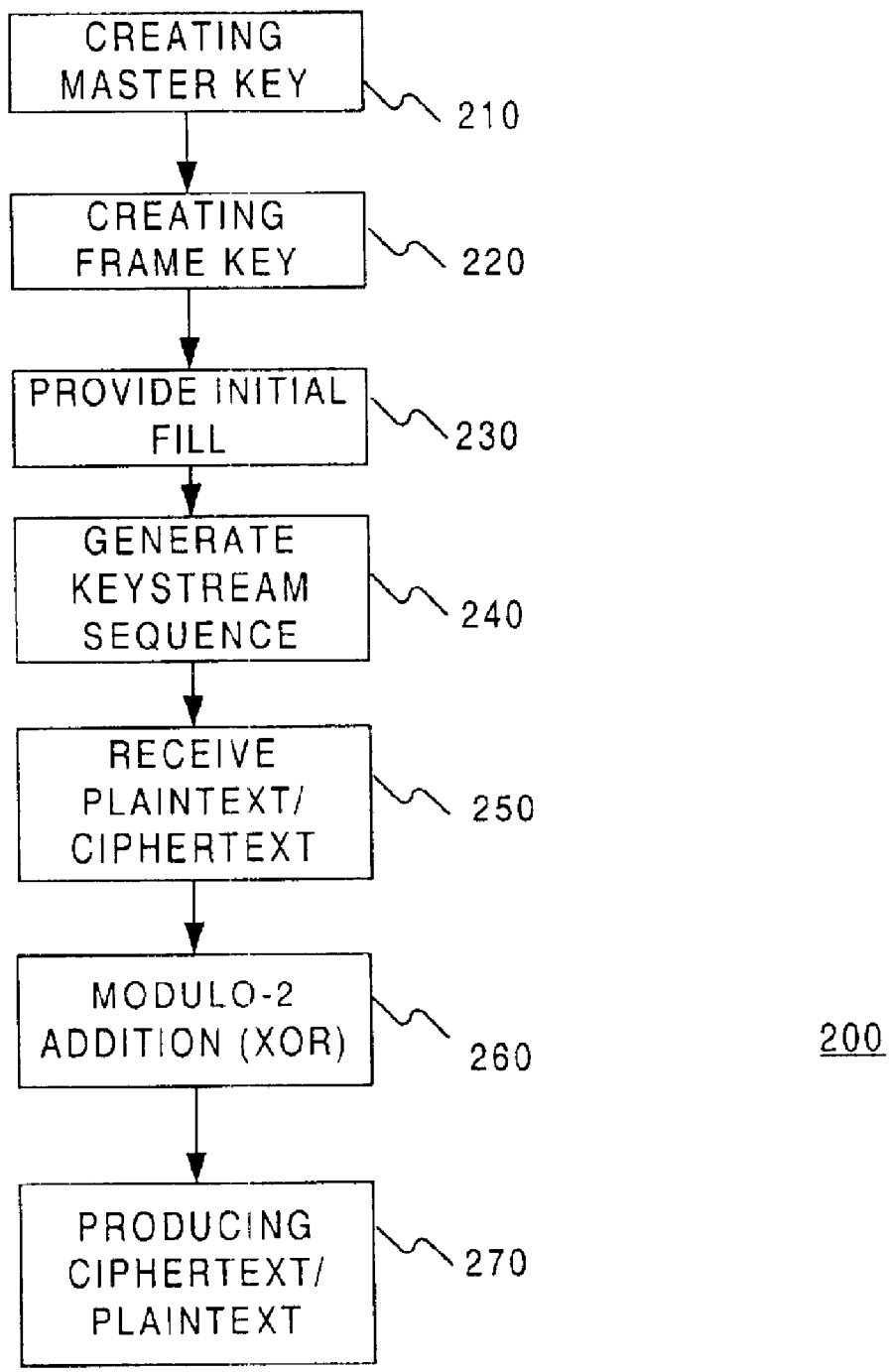
FIG. 2 illustrates a high-level flow chart of a stream cipher method, in accordance with methods and systems consistent with the present invention.

FIG. 2 shows a flow chart depicting steps 200 for generating cipher text or plaintext in accordance with systems and methods consistent with the present invention. Referring to FIG. 2, the steps may include, for example, creating a master key (step 210); creating a frame key (step 220); providing an initial fill (step 230); generating a keystream sequence (step 240); receiving plaintext or ciphertext (step 250); modulo-2 adding the generated keystream sequence with the received plaintext or ciphertext (step 260); and producing ciphertext or plaintext, respectively (step 270).

To create a master key (step 210), the key scheduler 102 may create a master key from a key, such as a private key. The private key may be known only to the user of the stream cipher system 100 and may be unique to a device, user, or communication session. The key scheduler 102 may create a master key using a secure hash or using, for example, steps consistent with the pseudo-code of Table 1.

To create a frame key (step 220), the frame key generator 104 may create a frame key based on the master key and a frame number for the frame of information to be enciphered. In one embodiment, the frame key generator 104 may create the frame key using, for example, steps consistent with the pseudo-code of Table 2.

To provide an initial fill (step 230), the keystream generator 106 may be loaded with the master key or, alternatively, the frame key. The registers of the keystream generator 106, such as the registers included within the keystream generator (see, e.g., the filter generator 302 and lagged-Fibonacci generator 304 at FIG. 3) may be loaded with the master key or, alternatively, the frame key. For example, in one embodiment, the master key included 21 words. Each of the 21 words is loaded in a register of the keystream generator 106 (i.e., registers 1–4 of the filter generator 302 and registers 1–17 of the lagged-Fibonacci generator 304).

To generate a keystream sequence (step 240), the keystream generator 104 may use the master key or, alternatively, the frame key, as an initial fill that establishes an initial state for the registers of the keystream generator 104. From the initial state, the keystream generator 104 may change states and produce a keystream sequence that includes a sequence of bits, such as a pseudo-random bit sequence.

The keystream sequence produced by the keystream generator 104 may be modulo-2 added 108 (step 260) with a bit stream of plaintext (step 250) to produce a bit stream of ciphertext (step 270). In one embodiment, the modulo-2 adder 108 performs an XOR operation using each bit of the bit stream of plaintext and a corresponding bit in the keystream sequence (step 260) to produce the bit stream of ciphertext. Alternatively, the keystream sequence produced by the keystream generator 104 may be modulo-2 added 108 (step 260) with the bit stream of ciphertext (step 250) to produce the bit stream of plaintext (step 270).

FIG. 3 illustrates a block diagram of a keystream generator 106 that may include a filter generator 302, a lagged-Fibonacci generator 304, and a modulo-2 adder 108 that is implemented using XOR logic. The bit streams produced by each of the lagged-Fibonacci generator 304 and the filter generator 302 may be modulo-2 added 108 in a bitwise manner to produce the keystream sequence. The keystream sequence may then may be XORed (i.e., modulo-2 added) with a bit stream of plaintext 110 to produce a bit stream of ciphertext 112 or, alternatively, with a bit stream of ciphertext 110 to produce a bit stream of plaintext 112. In one embodiment, the key stream generator 106 may use a word-oriented structure, such as a 32-bit word structure although other structures may be used instead.

As noted above, the frame key generator 104 may generate the frame key based on the master key and the frame number for the respective frame of information to be enciphered. In turn, the frame key may be used as an initial fill for the linear feedback shift registers 306, 311 of the keystream generator 106. The linear feedback shift registers 306, 311 may be filled with the frame key to establish an initial state for the linear feedback shift registers 306, 311.

Alternatively, the master key may be used as the initial fill for the linear feedback shift registers 306, 311. For example, the initial fill for the linear feedback shift registers 306, 311 may include 4 words for the linear feedback shift register 306 and 17 words for the linear feedback shift register 311. With the initial fill loaded, the linear feedback shift registers 306, 311 may then be clocked regularly to produce different states for the linear feedback shift registers 306, 311, producing a sequence of bits (also referred to herein as a bit stream).

The filter generator 302 may include the linear feedback shift register 306 and a nonlinear filter 308. The filter generator 302 may be word-oriented, such as a four-word linear feedback shift register 306 such that each word includes 32 bits. Moreover, the linear feedback shift register 306 may have an output sequence that satisfies the following recursion:

$$S_n = S_{n-2} \oplus S_{n-3} <<31 \oplus S_{n-4} >>1, n \geq 4,$$

where << corresponds to a zero-fill left-shift operation, >> corresponds to a zero-fill right shift operation, $\oplus$ corresponds to an XOR logic operation, n is the number of stages in the linear feedback shift register 306 (e.g., 4 words), and $S_n \in GF(2)^{32}$. For example, $S_{n-3}<<31$ represents zero-fill left shift of 31 bits for word 3, and $S_{n-4}>>1$ represents a zero-fill right shift of one bit for word 4.

The nonlinear filter 308 may receive the four-word output sequence of the linear feedback shift register 306 and produce a one-word output sequence. The nonlinear filter 308 may be memoryless, such that the output at any given time only depends on the current content of the nonlinear filter.

In one embodiment, the nonlinear filter 308 may satisfy a nonlinear function of the form:

$$F(x_{n+3}, x_{n+2}, x_{n+1}, x_n)$$

where $(x_{n+3}, x_{n+2}, x_{n+1}, x_n)$ represents the content of the word-oriented linear feedback shift register 306 at time n. The output of the nonlinear filter 308 at time n may be represented as $Z'_n$ and based on pseudo-code of Table 3. Table 3 shows pseudo-code from which code, such as C++, C, assembly language, microcode, or any other type of program instruction may be written and then executed using a processor.

TABLE 3

PSEUDO-CODE FOR NONLINEAR-FUNCTION F
$(X_{N+3}, X_{N+2}, X_{N+1}, X_N)$

| | |
|---|---|
| 1 | $A \leftarrow x_{n+3} + (x_n \vee 1) \bmod 2^{32}$ |
| 2 | $c \leftarrow$ carry |
| 3 | cyclic shift A left 16 bits |
| 4 | if (c = 0) then |
| 5 | $\quad A \leftarrow A + x_{n+2} \bmod 2^{32}$ |
| 6 | else |
| 7 | $\quad A \leftarrow A + (x_{n+2} \oplus (x_n \vee 1)) \bmod 2^{32}$ |
| 8 | $c \leftarrow$ carry |
| 9 | return $A + (x_{n+1} \oplus x_{n+2}) + c \bmod 2^{32}$ |

The function $F(x_{n+3}, x_{n+2}, x_{n+1}, x_n)$ may also be expressed as the following equation:

$$Z'_n = <x_{n+3} + (x_n \vee 1)>_{16} + x_{n+2} \oplus c_1(x_n \vee 1) + x_{n+1} \oplus x_{n+2} + c_2 \bmod 2^{32}.$$

where $c_1$ corresponds to the first carry bit from line 2 at Table 3, and $c_2$ corresponds to the second carry bit from Table 3 at line 8, $<A>_{16}$ represents the result of cyclically shifting A left 16 bits (i.e., where A is a 32-bit word), V represents bitwise "OR" operation. Moreover, XOR logic (⊕) has precedence over addition (+). Note that the least significant bit of $x_n$ may be masked by a "1" to eliminate the effect of stage "0", which is not used in the linear feedback shift register 306.

The lagged-Fibonacci generator 304 may include a linear feedback shift register 311 with OR logic 380 and a multiplexer 310. Moreover, the lagged-Fibonacci generator 304 may produce a pseudo-random bitstream sequence in the form of a lagged-Fibonacci sequence. A lagged-Fibonacci generator may be characterized by the following recursion:

$$y_n = y_{n-s} + y_{n-r} \bmod M, \; n \geq r.$$

where the lagged-Fibonacci generator 304 defined by the modulus M, the register length r, and the lag s, where r>s. When M is a prime number, periods as large as M'−1 may be achieved for the generated sequences.

In one embodiment, the lagged-Fibonacci sequence produced by the lagged-Fibonacci generator 304 may satisfy the following recursion:

$$L_n = L_{n-5} + L_{n-17} \bmod 2^{32}$$

where the number of stages of the linear feedback shift register 311 for the lagged-Fibonacci generator 304 is greater than or equal to 17 words.

Furthermore, the multiplexer 310 may select one of the words from the 17-word state of the linear feedback shift register 311 and output the selected word to the XOR logic 108 based on the value of the most significant bits of $L_n$ (i.e., the 4 most significant bits 29–32). In one embodiment, the multiplexer 310 may be used to improve the security of the keystream generator 106 by masking the state of the linear feedback shift register 311.

Figure 4:
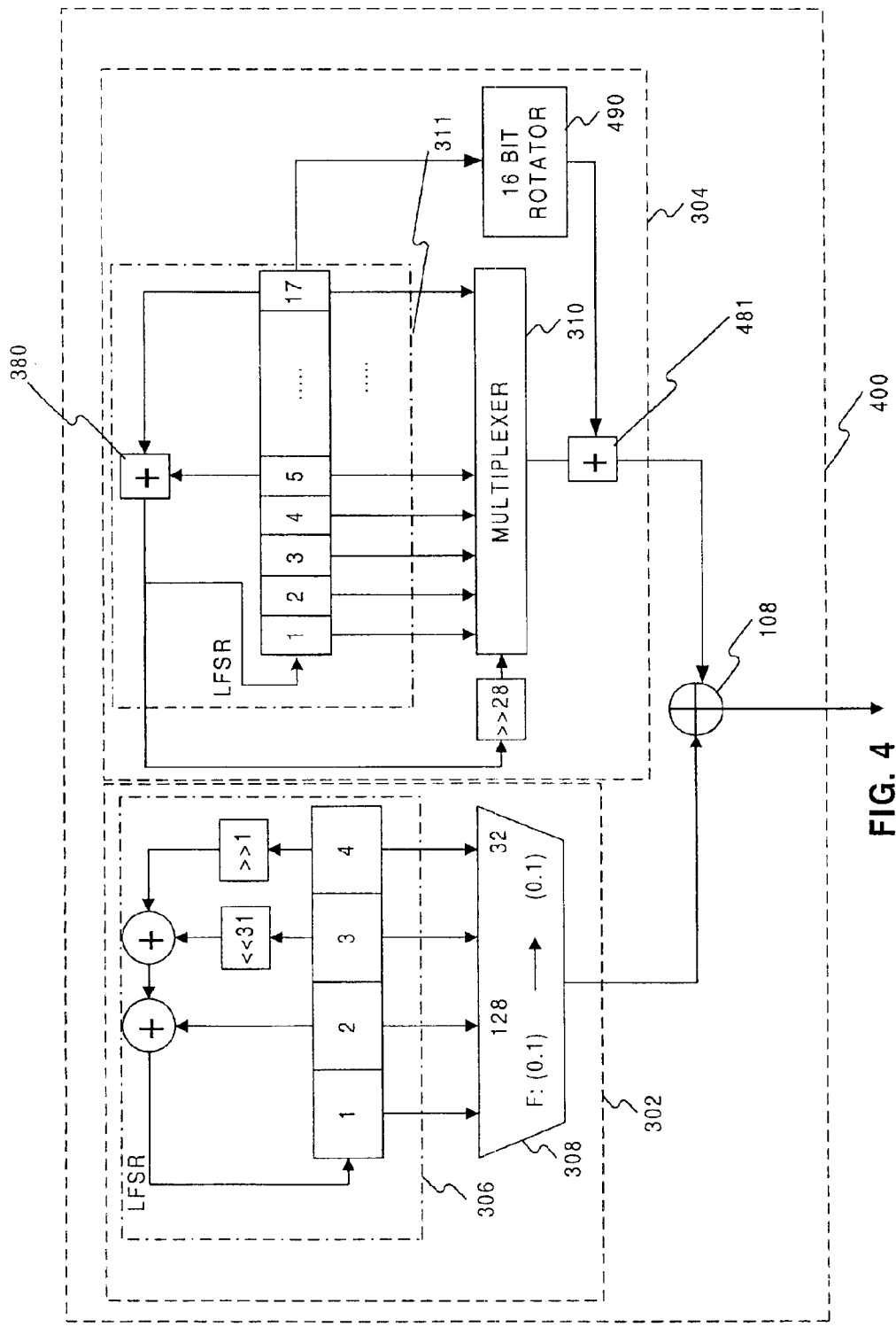
FIG. 4 illustrates a block diagram of a second embodiment of a keystream generator, in accordance with methods and systems consistent with the present invention.

FIG. 4 shows another embodiment for the key generator 106 of FIG. 3. The key generator 400 of FIG. 4 includes a 16-bit rotator 490 connected to the output of the linear feedback shift register 311 of the lagged-Fibonacci generator 304. The output of the 16-bit rotator 490 is combined with the output of the multiplexer 310 using OR logic 481 to produce a lagged-Fibonacci sequence. The use of the 16-bit rotator may also mask the state of the linear feedback shift register 311.

Referring to FIG. 4, the lagged-Fibonacci generator 304 may be configured with s=5, r=17, and M=$2^{32}$. Moreover, the 16-bit rotator 490 may serve as a 17-stage circular buffer (B), with two pointers referred to below in Table 4 as s and r. For example, B[17], B[16], . . . , B[1] may be loaded with $y_0, y_1, \ldots, y_{16}$ (i.e., the outputs of the linear feedback shift register 311), and s and r may be set to 5 and 17, respectively. With each clock, a new word is produced that includes the sum of B[r] and B[s] mod $2^{32}$. The word B[r] is then replaced by a new word ($y_n$), and the pointers s and r are decreased by 1. As a result, the buffer B produces the lagged-Fibonacci sequence.

The multiplexer 310 may generate an output sequence $Z_n''$, where n≥0. The output sequence (i.e., the output word $z_n''$) may be computed from the new word $y_n$ and another word selected from the buffer B. The selection may be based on the four most significant bits of the newly produced word $y_{n+17}$. The output word at time n, may be defined by the following equation:

$$z_n'' = <y_n>_{16} + B[1 + ((y_{n+17} >> 28) + S_{n+1} \bmod 16)] \bmod 2^{32}$$

where $z_n''$ is the output word at time n, and $s_{n+1}$ corresponds to the value of s at time n+1. The output word $z_n''$ may be generated based on the pseudo-code of Table 4. Table 4 shows pseudo-code from which code, such as C++, C, assembly language, microcode, or any other type of program instruction may be written and then executed using a processor.

TABLE 4

PSEUDO-CODE FOR THE OUTPUT WORD $z_n''$

| 1 | A ← B[R] |
|---|---|
| 2 | D ← B[s] + B[r] mod $2^{32}$ |
| 3 | B[r] ← D |
| 2 | r ← r − 1 |
| 3 | s ← s − 1 |
| 4 | if (r = 0) then r ← 17 |
| 5 | if (s = 0) then s ← 17 |
| 6 | cyclically shift A left 16 bits |
| 7 | output A + B[1 + (s + D >> 28 mod 16)] mod $2^{32}$ |

Accordingly, the stream cipher system 100 may provide one or more of the following cryptographic properties (i.e., assuming that $S_0$ and $L_0$ denote the initial states of the filter generator 302 and the lagged-Fibonacci generator 304, and that $Z_n$ (for n≥0) denotes the keystream sequence generated by the keystream generator 106:

(1) If $S_0$ is not equal to zero and the least significant bit of one of the words in $L_0$ is not zero, then the sequence $Z_n$ (for n≥0) may include a period of at least $2^{128}-2$;

(2) If $S_0$ is not equal to zero, the linear complexity of $Z_n$ may be greater than $2^{126}$ (3) with a probability no less than $e^{-1/127}$;

(4) The entropy of $Z_n$ may be bounded by 32-I($S_0$;$L_0$) ≤H($Z_n$)≤32, where I($S_0$;$L_0$) corresponds to the mutual information between $S_0$ and $L_0$, and H($Z_n$) corresponds to the entropy of $Z_n$ (Accordingly, $Z_n$ may be uniformly distributed if $S_0$ and $L_0$ are independent); and (5) Further, assuming that $S_0$ and $L_0$ are random variables, then the following equation may be satisfied:

$$I(Z_n;S_0) \leq I(S_0;L_0) \text{ and } I(Z_n;L_0) \leq I(S_0;L_0).$$

Moreover, (4) above may indicate that a "divide and conquer" correlation attack may not be possible on either the filter generator or the lagged-Fibonacci generator when the initial states $S_0$ and $L_0$ are independent.

In one embodiment, the stream cipher system 100 may be embodied using in program instructions, such as ANSI C capable of being executed on various processors including, for example, a 40 MHz Sun Sparc 2 providing an effective enciphered throughput of 26 Mbits/s; a 166 MHz Sun Ultra 1 providing an effective enciphered throughput of 146 Mbits/s; and a 466 MHz Alpha Personal Workstation, providing an effective enciphered throughput of 607 Mbits/s.

The stream cipher system 100 may be used to encipher voice and data transmitted over unprotected media such as a wireless channel, Internet, or telephone network. The stream cipher system 100 may provide fast encryption enabling high throughputs while retaining good cryptographic properties. Furthermore, the stream cipher system 100 may be implemented in processors with low computational power, such as cellular telephones, personal digital assistants (PDAs), and pagers. Moreover, the stream cipher system 100 may provide one or more of the following advantages: defending against divide and conquer correlation attacks; providing software portability on 8-bit, 16-bit, and 32-bit processors; requiring small memory usage and eliminating table look-ups; providing efficient rekeying that uses a subkey for each frame reducing synchronization problems; and providing a fast software stream cipher with some beneficial and provable cryptographic properties.

Figure 5:
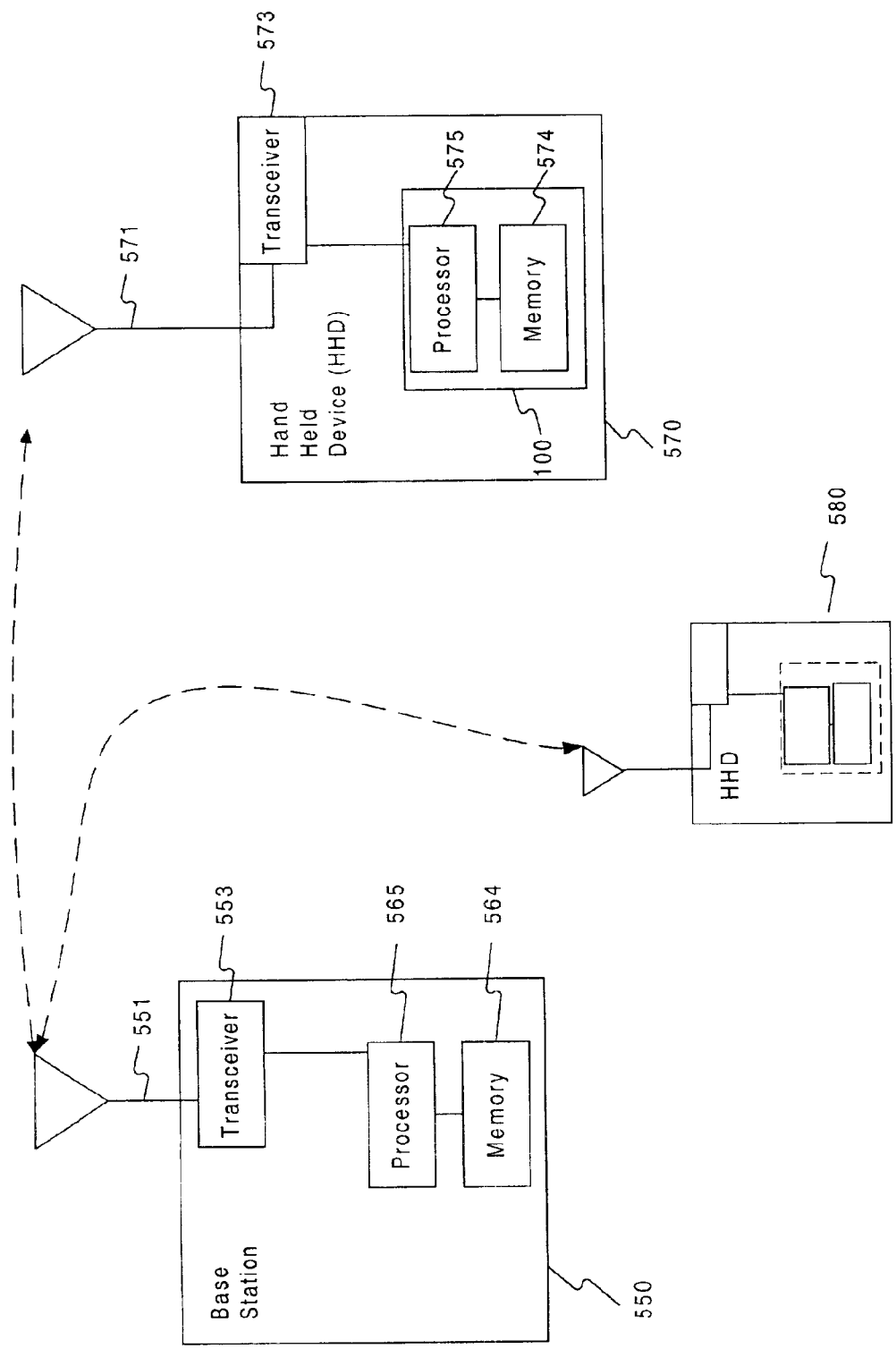
FIG. 5 illustrates a block diagram of a hand held device including a keystream generator, in accordance with methods and systems consistent with the present invention.

FIG. 5 shows exemplary block diagram of a base station 550 and one or more hand held devices 570, 580. The base station 550 may further include an antenna 551, a transceiver 553, a processor 565, and a memory 564. In one embodiment, the base station 550 may communicate with the one or more hand held devices 570, 580. The hand held device 570 may include an antenna 571, a transceiver 573, a processor 575, and a memory 574. An example of a hand held device 570 includes a personal digital assistant, a wireless device, a mobile phone, and a pager.

The hand held device 570 may include a stream cipher system 100. In an embodiment, the processor 575 and memory 574 include the stream cipher system 100 preconfigured for operation. Alternatively, the base station 550 may provide the processor 575 and memory 574 with code and/or information that is capable configuring the processor 575 and memory 574 as the stream cipher system 100. As a result, the hand held device 573 may decipher and encipher information using the stream cipher system 100 included within the processor 575 and memory 574. Moreover, the enciphered information may be communicated using the transceiver 573 and antenna 571 to the base station 550 and other communication devices configured with the stream cipher system, such as hand held device 580.

In an embodiment, the base station 550 may configure the stream cipher system 100 by providing code and/or information code to the processor 575 and memory 574 to configure the hand held device 570. For example, when the hand held device 570 contacts the base station 550 the base station 550 may provide the hand held device 570 with code and/or information that is capable configuring the processor 575 and memory 574 as the stream cipher system 100.

Moreover, the base station 550 may reconfigure a cipher that may be resident in the hand held device 570 by providing code and/or information that is capable of reconfiguring the processor 575 and memory 574 as the stream cipher system 100. For example, the base station 550 may provide additional code and/or information that reconfigures one or more aspects of the stream cipher system 100, such as varying the filter generator 306, varying the lagged-Fibonacci generator 304, varying the tap points of the linear feedback shift registers 306, 311, varying the number of bits shifted (i.e., left or right) by the linear feedback shift registers 306, 311, modifying the multiplexer 308, disabling the multiplexer 308, and/or disabling the lagged-Fibonacci generator 304. Moreover, the base station 550 may provide a key, such as a master key or a frame key to the keystream generator 106. In an embodiment, the base station 550 may provide code and/or information that reconfigures the stream cipher system 100 by changing the number of zero-fill bit shifts performed on the third word of the linear feedback shift register 306. Accordingly, the stream cipher system 100 incorporated into the hand held device 570 may be readily modified.

The above embodiments and other aspects and principles of the present invention may be implemented in various environments. Such environments and related applications may be specially constructed for performing the various processes and operations of the invention or they may include a general-purpose computer or computing platform selectively activated or reconfigured by program code (also referred to as code) to provide the necessary functionality. The processes disclosed herein are not inherently related to any particular computer or other apparatus, and may be implemented by a suitable combination of hardware, software, and/or firmware. For example, various general-purpose machines may be used with programs written in accordance with teachings of the present invention, or it may be more convenient to construct a specialized apparatus or system to perform the required methods and techniques.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. Examples of program instructions include for example micro-code, machine code, such as produced by a compiler, and files containing a high-level code that can be executed by the computer using an interpreter.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A method for processing information comprising the steps of:

providing a frame key based on a master key and a frame number of a frame of information to a keystream generator as an initial fill for one or more registers of the keystream generator such that the initial fill establishes a state for the one or more registers of the keystream generator; and generating, at the keystream generator, a keystream sequence based on the state established by the initial fill, wherein the keystream sequence includes a modulo-2 sum of a lagged-Fibonacci sequence and a pseudo-random sequence produced by a filter generator.

2. The method of claim 1, further comprising the step of:

creating a second frame key based the master key and a second frame number such that the second frame key represents a second frame of information.

3. The method of claim 1, wherein said providing further comprises the step of:

initializing the one or more registers of the keystream generator based on the frame key.

4. The method of claim 3, wherein said initializing further comprises the step of:

initializing a first linear feedback shift register of the filter generator with the frame key.

5. The method of claim 4, further comprising the step of:

defining the first linear feedback generator of the filter generator as producing the pseudo-random sequence that satisfies the following equation:

$$S_n = S_{n-2} \oplus S_{n-3} << 31 \oplus S_{n-4} >> 1, n \geq 4,$$

wherein << corresponds to a zero-fill left-shift operation, >> corresponds to a zero-fill right shift operation, $\oplus$ denotes XOR logic, and n is the number of stages in the first linear feedback shift register.

6. The method of claim 1, wherein said generating further comprises the step of:
shifting one or more bits of a first word corresponding to one of a plurality of registers of the keystream generator; and
shifting one or more bits of a second word corresponding to a second of the plurality of registers.

7. The method of claim 6, further comprising the step of:
combining the shifted first word with the shifted second word based on exclusive OR logic.

8. The method of claim 1, further comprising the step of:
producing a bit stream of ciphertext by modulo-2 adding each bit in the keystream sequence produced by the keystream generator with a corresponding bit in a bit stream of plaintext.

9. The method of claim 1, further comprising the step of:
producing a bit stream of plaintext by modulo-2 adding each bit in the keystream sequence produced by the keystream generator with a corresponding bit in a bit stream of ciphertext.

10. The method of claim 1, wherein said generating further comprises the step of:
producing the lagged-Fibonacci sequence using a lagged-Fibonacci generator.

11. The method of claim 10, further comprising the step of:
initializing a second linear feedback shift register of the lagged-Fibonacci generator with the frame key.

12. The method of claim 10, further comprising the step of:
defining the lagged-Fibonacci sequence as satisfying the following equation:

$$L_n = L_{n-5} + L_{n-17} \bmod 2^{32},$$

wherein n corresponds to the number of stages of in the second linear feedback shift register and is greater than or equal to 17 words of 32-bits, and mod $2^{32}$ corresponds to modulo-2 addition of a 32 bit word.

13. The method of claim 10, further comprising the step of:
rotating an output of the lagged-Fibonacci generator.

14. A system for processing information, said system comprising:
at least one memory including:
code that provides a frame key based on a master key and a frame number of a frame of information to a keystream generator as an initial fill for one or more registers of the keystream generator such that the initial fill establishes a state for the one or more registers of the keystream generator, and
code that generates, at the keystream generator, a keystream sequence based on the state established by the initial fill, wherein the keystream sequence includes a modulo-2 sum of a lagged-Fibonacci sequence and a pseudo-random sequence produced by a filter generator; and
at least one processor that executes said code.

15. The system of claim 14, further comprising:
code that creates a second frame key based the master key and a second frame number such that the second frame key represents a second frame of information to be enciphered.

16. The system of claim 14, wherein said code that provides the frame key further comprises:
code that initializes the one or more registers of the keystream generator based on the frame key.

17. The system of claim 16, wherein said code that initializes the one or more registers further comprises:
code that initializes a first linear feedback shift register of the filter generator with the frame key.

18. The system of claim 17, further comprising:
code that defines the first linear feedback generator of the filter generator as producing the pseudo-random sequence that satisfies the following equation:

$$S_n = S_{n-2} \oplus S_{n-3} << 31 \oplus S_{n-4} >> 1, n \geq 4,$$

wherein << corresponds to a zero-fill left-shift operation, >> corresponds to a zero-fill right shift operation, $\oplus$ denotes XOR logic, and n is the number of stages in the first linear feedback shift register.

19. The system of claim 14, wherein said code that generates further comprises:
code that shifts one or more bits of a first word corresponding to one of a plurality of registers of the keystream generator; and
code that shifts one or more bits of a second word corresponding to a second of the plurality of registers.

20. The system of claim 19, further comprising:
code that combines the shifted first word with the shifted second word based on exclusive OR logic.

21. The system of claim 14, further comprising:
code that produces a bit stream of ciphertext by modulo-2 adding each bit in the keystream sequence produced by the keystream generator with a corresponding bit in a bit stream of plaintext.

22. The system of claim 14, further comprising:
code that produces a bit stream of plaintext by modulo-2 adding each bit in the keystream sequence produced by the keystream generator with a corresponding bit in a bit stream of ciphertext.

23. The system of claim 14, wherein said code that generates a keystream sequence further comprises:
code that produces the lagged-Fibonacci sequence using a lagged-Fibonacci generator.

24. The system of claim 23, further comprising:
code that initializes a second linear feedback shift register of the lagged-Fibonacci generator with the frame key.

25. The system of claim 23, further comprising:
code that defines the lagged-Fibonacci sequence as satisfying the following equation:

$$L_n = L_{n-5} + L_{n-17} \bmod 2^{32},$$

wherein n corresponds to the number of stages of in the second linear feedback shift register and is greater than or equal to 17 words of 32-bits, and mod $2^{32}$ corresponds to modulo-2 addition of a 32 bit word.

26. The system of claim 23, further comprising:
code that rotates an output of the lagged-Fibonacci generator.

27. A computer program product, the computer program product comprising code, said code comprising:
code that provides a frame key based on a master key and a frame number of a frame of information to a keystream generator as an initial fill for one or more registers of the keystream generator such that the initial fill establishes a state for the one or more registers of the keystream generator; and code that generates, at the keystream generator, a keystream sequence based on the state established by the initial fill, wherein the keystream sequence includes a modulo-2 sum of a lagged-Fibonacci sequence and a pseudo-random sequence produced by a filter generator.

28. The computer program product of claim 27, said code further comprising:
code that produces a bit stream of ciphertext by modulo-2 adding each bit in the keystream sequence produced by the keystream generator with a corresponding bit in a bit stream of plaintext.

29. The computer program product of claim 27, said code further comprising:
code that produces a bit stream of plaintext by modulo-2 adding each bit in the keystream sequence produced by the keystream generator with a corresponding bit in a bit stream of ciphertext.

30. A hand held device for communicating information, said hand held device comprising:
at least one memory including:
code that provides a frame key based on a master key and a frame number of a frame of information to a keystream generator as an initial fill for one or more registers of the keystream generator such that the initial fill establishes a state for the one or more registers of the keystream generator, and
code that generates, at the keystream generator, a keystream sequence based on the state established by the initial fill, wherein the keystream sequence includes a modulo-2 sum of a lagged-Fibonacci sequence and a pseudo-random sequence produced by a filter generator;
at least one processor that executes said code.

31. The hand held device of claim 30, further comprising:
code that receives one or more keys from a base station such that the one or more keys initialize one or more registers of the keystream generator.

32. The hand held device of claim 30, further comprising:
code that receives code and information from a base station.

33. The hand held device of claim 32, further comprising:
code that configures the keystream generator based on the received code and information.

* * * * *